March 3, 1931. L. GROSS 1,795,167
SUCCESSIVE IMMERSION DEVICE
Filed Oct. 17, 1928 6 Sheets-Sheet 2
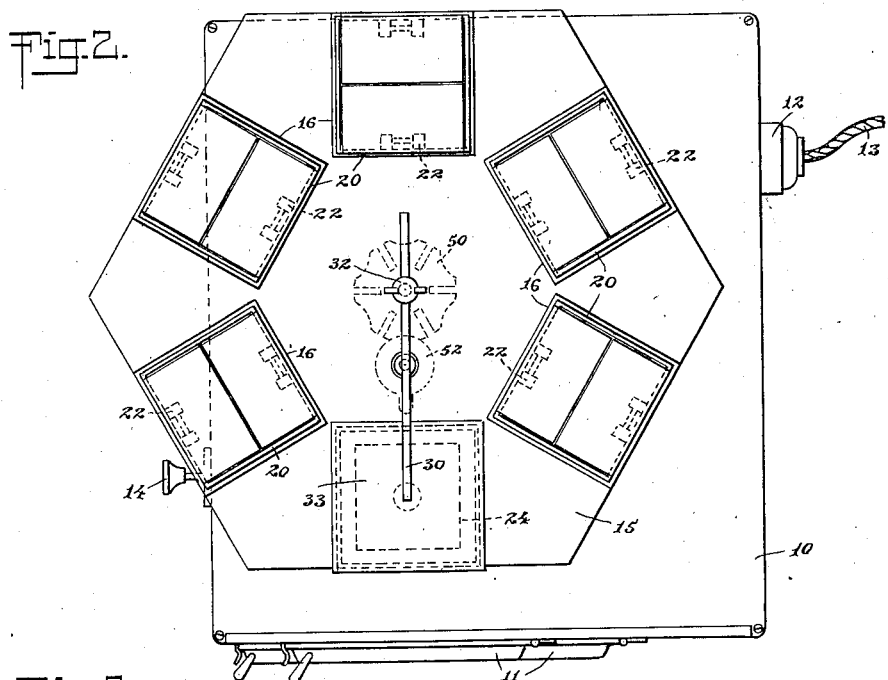
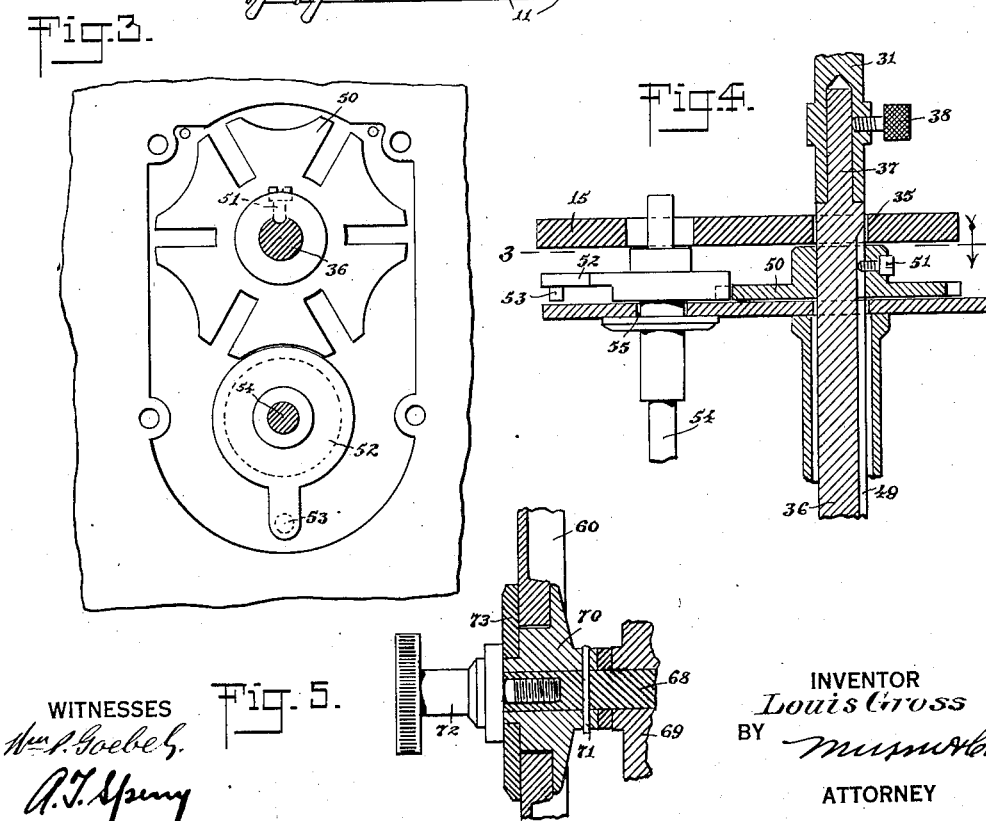
INVENTOR
Louis Gross
BY
ATTORNEY March 3, 1931. L. GROSS 1,795,167
SUCCESSIVE IMMERSION DEVICE
Filed Oct. 17, 1928 6 Sheets-Sheet 3

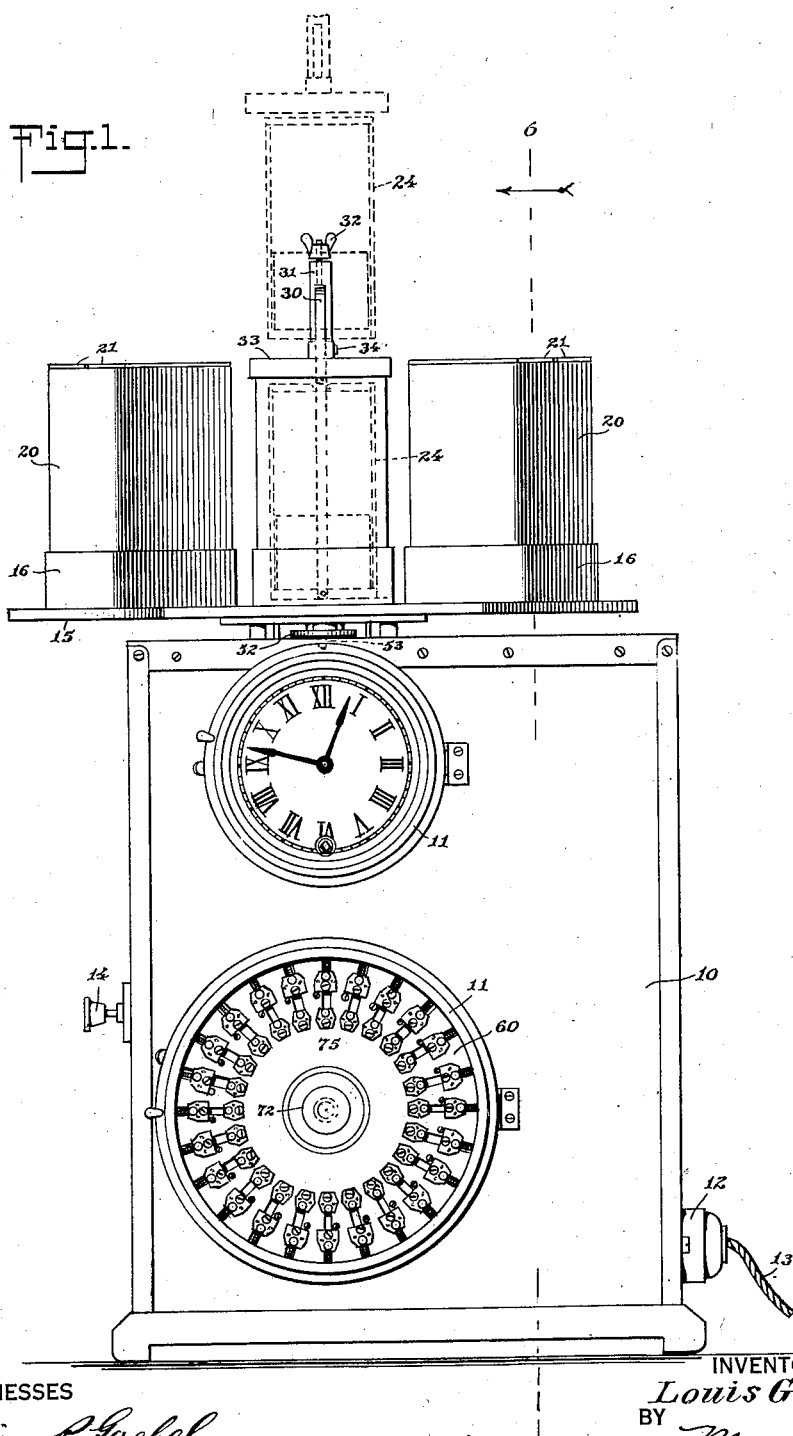

WITNESSES
INVENTOR
Louis Gross
BY
ATTORNEY

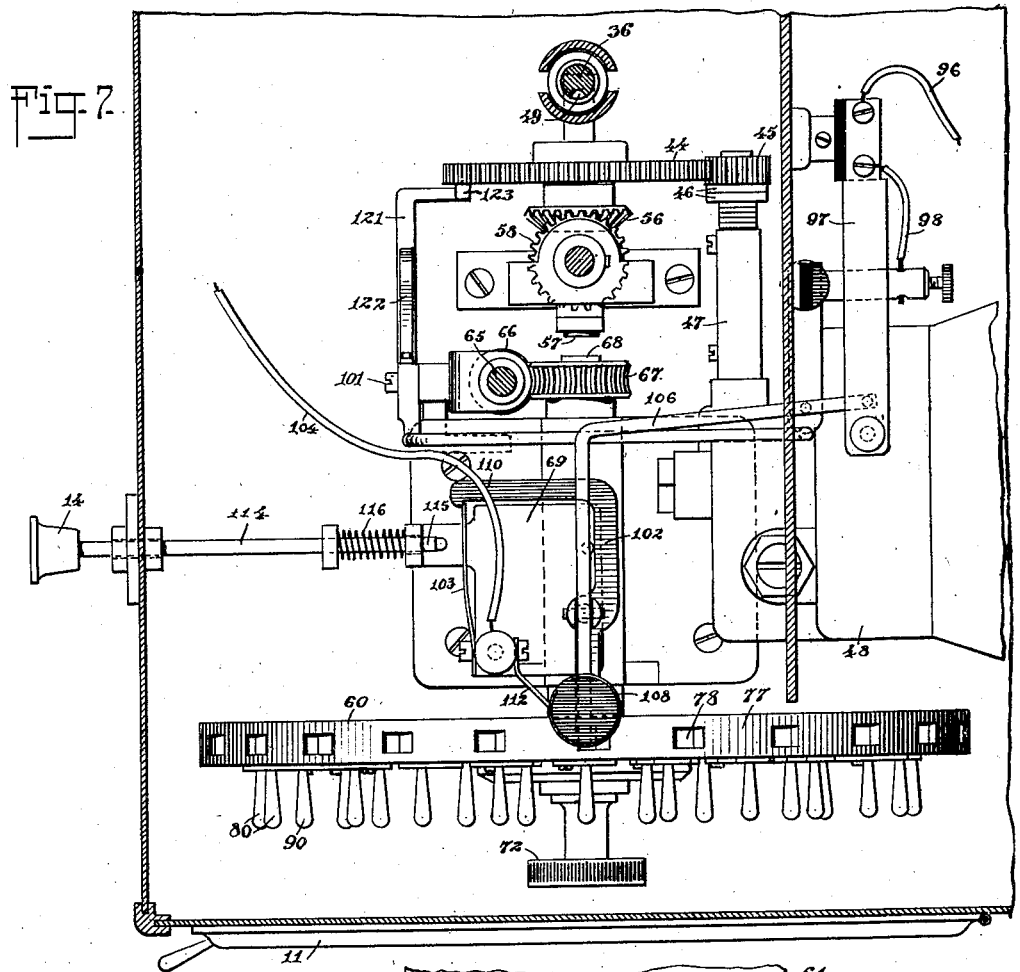

March 3, 1931.   L. GROSS   1,795,167
SUCCESSIVE IMMERSION DEVICE
Filed Oct. 17, 1928   6 Sheets-Sheet 5
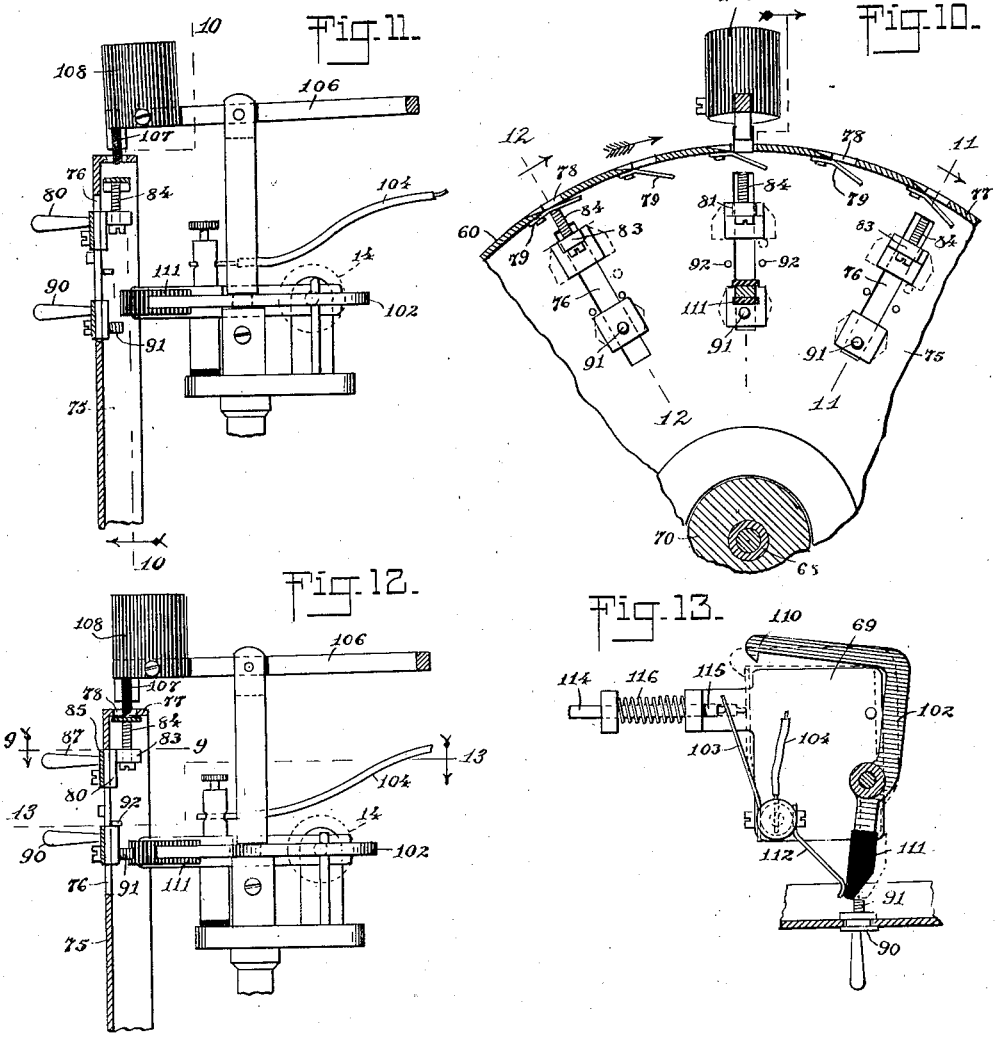
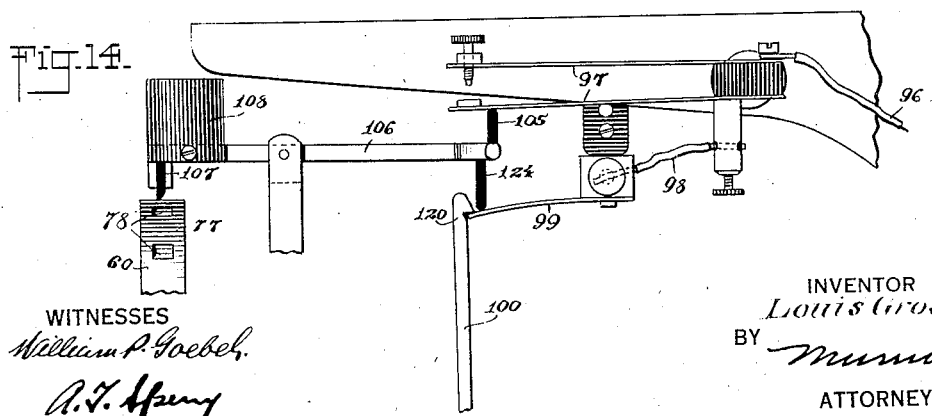
WITNESSES
INVENTOR
Louis Gross
BY
ATTORNEY

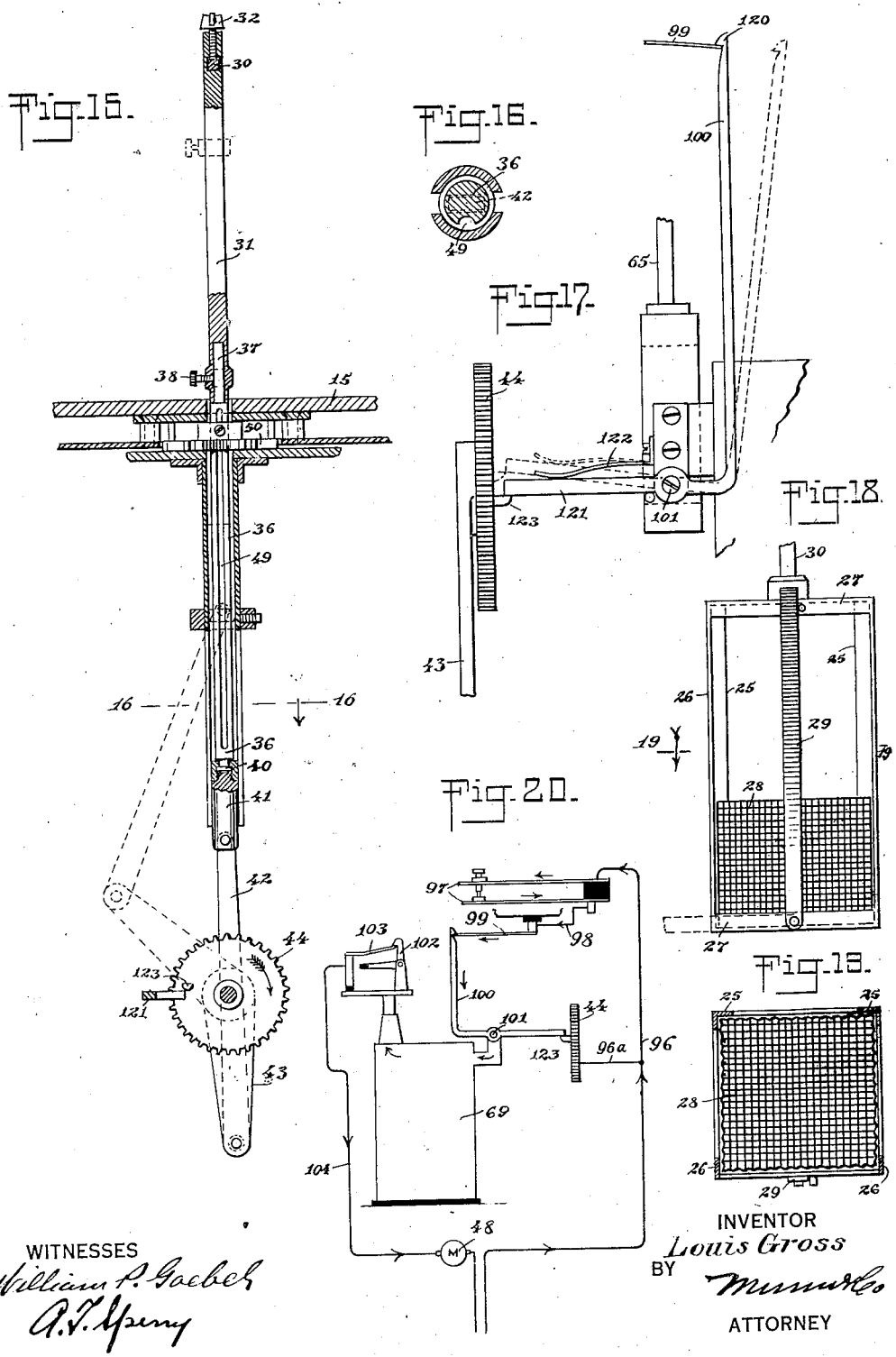

Patented Mar. 3, 1931

1,795,167

UNITED STATES PATENT OFFICE

LOUIS GROSS, OF NEW YORK, N. Y.

SUCCESSIVE-IMMERSION DEVICE

Application filed October 17, 1928. Serial No. 313,169.

This invention has been termed a "successive immersion device."

It is an object of the present invention to provide an apparatus designed to automatically transfer substances into and out of a desired medium or environment.

It is a further object of the present invention to provide a device of the character set forth, which will automatically successively present substances to a plurality of different media or environments.

A further object of the invention is to provide a device of the character set forth, which may be set to subject the substance to the desired medium for any desired pre-determined length of time, and which will thereafter remove the substance from the medium and present it to a different medium for any desired predetermined length of time.

A further object of the present invention is to provide a wholly automatic apparatus which is adapted to successively present a substance to environments, or immerse it in a medium, the duration of time in which the substance is subjected to the medium or environment being predetermined and controlled by the setting of the apparatus.

Other important objects of the invention include the combination and interrelation of parts, whereby the whole forms a compact efficient apparatus which will be wholly automatic in operation, and which is admirably suited to economic manufacture.

These and other objects of the present invention will be apparent from a consideration of the drawings, in which—

Fig. 1 is a view in front elevation.

Fig. 2 is a top plan view.

Fig. 3 is a sectional view on the lines 3—3 of Fig. 4 showing the Geneva drive.

Fig. 4 is a vertical sectional view of that portion of the device illustrated in Fig. 3.

Fig. 5 is a sectional view of the selector disc mounting.

Fig. 7 is a sectional view on the lines 7—7 of Fig. 6.

Fig. 8 is a front elevation partly in section showing the selector disc and circuit controlling assembly.

Fig. 9 is a detail section showing the selector detent members of the selector disc, this view being taken on lines 9—9 of Fig. 12.

Fig. 10 is a rear elevation of the portions of the device shown in Fig. 8.

Fig. 11 is a view taken on the lines 11—11 of Fig. 10.

Fig. 12 is a view taken on lines 12—12 of Fig. 10.

Fig. 13 is a detail sectional view taken on the lines 13—13 of Fig. 12.

Fig. 14 is a detail side elevation of one of the motor controlling switches.

Fig. 15 is a detail section taken on the lines 15—15 of Fig. 6.

Fig. 16 is a sectional view taken on the lines 16—16 of Fig. 15.

Fig. 17 is a detail view of the contact-releasing member.

Fig. 18 is a view in elevation of the cage.

Fig. 19 is a sectional view taken on the lines 19—19 of Fig. 18.

Fig. 20 is a diagrammatic illustration of the electrical circuit involved.

Figure 6:
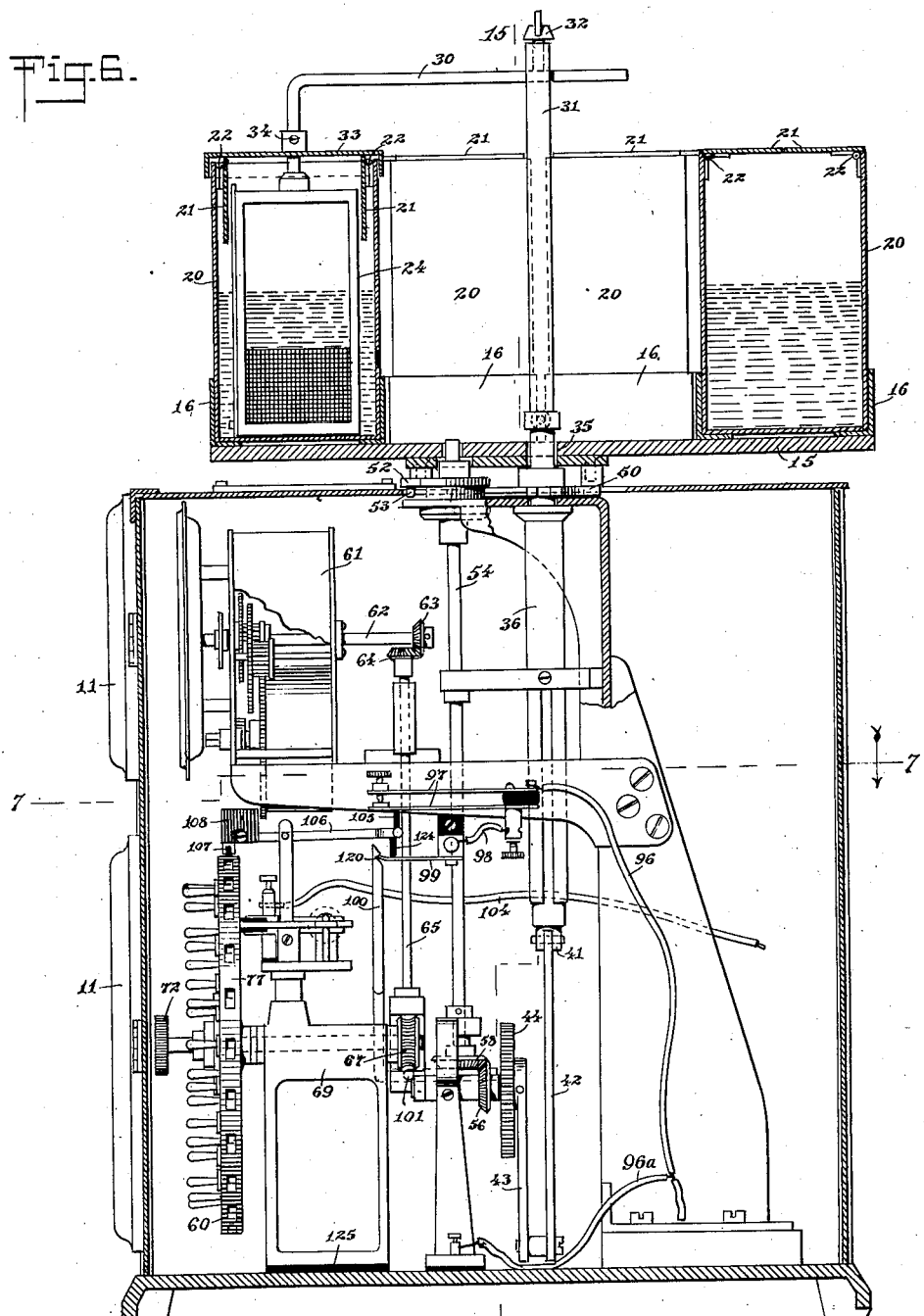
Fig. 6 is a sectional view on the lines 6—6 of Fig. 1.

Referring to the drawings and the specification, it will be understood that there is disclosed only one form of the present invention, and that the invention is readily adapted for a wide variety of uses, and that the structural details disclosed and illustrated may be subjected to numerous changes and modifications, and the full use of equivalents resorted to without departing from the spirit or scope of the present invention.

The apparatus herein disclosed is adapted for use as a laboratory instrument, the use of which is particularly designed for the selective subjection of substances to various fluids, this process of selective immersion being a prerequisite to microscopic investigations, as, for instance, in tissue examination.

It will be understood that the apparatus, however, may be used in many processes which require selective timed immersion.

Referring more particularly to Figures 1 and 2 of the drawings, the invention includes a cabinet 10 within which the moving parts of the apparatus are inclosed. The front face of the cabinet is preferably provided with suitable glass doors 11, through which portions of the mechanical apparatus within are visible, and which may be opened for regulation thereof, as will be hereinafter described.

Associated with one wall of the cabinet there is provided a socket 12 for the reception of an electrical connection with a suitable source of electrical supply as indicated by the conductor 13. The opposite side of the cabinet is provided with a suitable manual switch-controlling knob 14 associated with a switch within, as will be hereinafter referred to.

Associated with the top of the apparatus there is provided a platform 15 upon which is mounted a plurality of receivers 16 adapted to receive and secure in position a plurality of fluid receptacles, with which any desired fluid or other suitable material may be placed.

For holding the fluid there is provided a plurality of receptacles 20 removably positioned within the receivers 16, their side walls being preferably formed of glass or other transparent material. The upper ends of the receptacles 20 are preferably closed by a pair of cooperating hinged doors 21 associated with the sides of the receptacles 20 in hinged relation by the spring hinges 22, whereby their normal position will be closed as indicated upon the right in Figure 6, but which may be forced downwardly into open position by the entrance of an object into the receptacle 20 as shown to the left in Figure 6.

For conveying the material to be subjected to the fluid within the receptacles 20, a cage or a plurality of cages, as indicated at 24, may be provided, which preferably are in the form as illustrated in Figs. 18 and 19, and which include a pair of angle irons 25 forming the back of the cage, and a pair of straight side members 26 in alignment with the forwardly extending side of the members 25. The members 25 and 26 are associated at their extremities with a suitable top and bottom 27. It will be readily seen that this construction of the cage provides for the removable positioning therein of a fabric or wire basket 28, which may be retained in position by a member 29 pivoted to the bottom 27. It will be readily understood that material to be treated is positioned within the basket 28, which in turn is positioned within the cage, the member 29 being placed in vertical position, thus securing the basket within the cage. It will be further understood that upon lowering the cage downwardly over the top of the receptacles 20, the bottom 27 thereof will strike the covers 21 of the receptacle and cause them to be swung downwardly to admit the cage, the upper ends of the members 25 and 26 retaining the covers 21 in open position as illustrated to the left in Fig. 6. Upon withdrawal of the cage from the receptacle 20, it will be readily seen that the doors assume the position illustrated to the right in Fig. 6 under influence of the spring hinges 22, which retain them normally in this position.

For successively introducing the cage to the receptacles 20, the top 27 of the cage is associated with an arm 30 which extends vertically therefrom, and then at right angles thereto, its free end being received through a vertically moving and rotatable shaft 31. The arm 30 is adapted to be secured through the shaft 31 by the provision of a wing nut 32 or other suitable retaining means. The vertical portion of the arm 30 is provided with a cover member 33 slidably received thereover. This cover may be retained in position by a locking screw 34. By referring to Fig. 6, it will be readily seen that when the cage is received within the receptacle, the cover 33 is received over the sides of the receptacle 20, thus providing a closure for the receptacle. While in this position, the doors 22 are retained in open position by the sides of the cage.

For causing the required rotary and vertical movement of the shaft 31, the base 15 is apertured, as at 35, to receive therethrough a rotating and vertical drive shaft 36, the upper end of which is reduced as at 37 (Fig. 4) to be receivable within a corresponding bore in the lower end of the shaft 31, the shaft 31 being secured to the reduced portion 37 through the medium of a securing screw 38.

For causing vertical movement of the drive shaft 36 and consequently the shaft 31, the lower end of the drive shaft terminates in a mushroom head 40 receivable within and rotatable with respect to a coupling 41 which is bifurcated to receive a link 42 driven by a crank 43 mounted upon a driven gear 44 (Fig. 15). The driven gear 44 is suitably meshed with a driving gear 45 which receives rotation through frictional clutch plates 46 associated with a motor shaft 47 driven by a suitable electrical motor 48 more clearly illustrated in Figure 7.

It will thus readily be seen that upon energization of the motor 48, shaft 47 is rotated, thus rotating with it the gear 45 through its association with the shaft 47 through the clutch plates 46. It will be understood that rotation of the gear 45 causes similar but reduced rotation of the gear 44 which in turn by the association of the crank 43 and link 42 causes reciprocation of the shaft 36 and its associated shaft 31. It will be readily seen that should something intervene to prevent the reciprocation of the shaft 31, as for instance, a misplacement of one of the receptacles 20 whereby the cage might engage the edges thereof, that the motor 48 and drive shaft 47 are free to turn without the rotation of the gear 44.

For causing rotation of the shaft 31, there is associated with and keyed to the shaft 36, a Geneva gear 50 (Figs. 3 and 4), which loosely surrounds the shaft 36, but which is provided with an inwardly extending projection, such as a screw 51, receivable within a vertical groove 49 of the shaft 36, whereby the reciprocation of the shaft 36 may be had without effecting the rotation of the shaft under the influence of the screw 51 carried by the Geneva gear 50.

For cooperation with the Geneva gear 50 a cooperating gear 52 is provided including a projection 53 receivable within the radial slots of the gear, whereby upon continuous rotation of the cooperating gear 52 the Geneva gear will be caused to periodically move a fraction of a complete revolution, the fraction of the revolution corresponding to the number of radial slots in the gear and its corresponding configuration. For causing rotation of the cooperating gear 52 the gear is mounted for rotation upon a vertical shaft 54 journalled in an aperture 55 of the top of the cabinet 10. Referring to Figure 6 it will be seen that the lower end of the shaft 54 is provided with a beveled gear 58 adapted to cooperate with a corresponding beveled gear 56 mounted for rotation with a shaft 57 upon which the gear 44 is mounted, and which is rotatable therewith.

From the foregoing it will readily be seen that upon energization of the motor 48 and a complete revolution of the gear 44, the shaft 31 will be moved upwardly to its limit and thence downwardly to its limit. It will be understood that during this rotation of the gear 44, the shaft 54 makes one complete revolution, whereby the arrangement of the Geneva gear 50 and its cooperating gear 52 is such that during the initial upward movement of the shaft 31 the projection 53 of the cooperating gear 52 does not engage the gear 50. Thus no rotation of the shaft 31 takes place until the shaft 31 is elevated to an extent sufficient to remove the cage from the receptacle 20.

Shortly after the removal of the cage the projection 53 is received within one of the radial slots of the Geneva gear 50, whereby the gear is rotated in accompaniment with the conclusion of the upward vertical movement and the beginning of the lower vertical movement of the shaft 31. It will be seen however, that the projection 53 disengages from the slot in the Geneva 50 before the downward movement of the shaft 31 is such as to permit engagement of the cage with the receptacle 20. The rotary movement of the shaft 31 thus halts, and the continued downward motion is adapted to lower the cage within the next adjacent receptacle 20. It will be understood that the configuration of the Geneva movement and the placing of the receptacles is coordinated in conjunction with a coordination of the gearing 44; the complete action being a removal of the cage from one receptacle 20, and rotation of the shaft, whereby the cage is placed over the next adjacent receptacle and lowered therein, these operations being completed by a single revolution of the gear 44.

For controlling energization of the motor 48, there is provided a selector disc 60 adapted to be continuously rotated in a time controlled manner through the medium of a clock or similar structure 61 mounted upon a horizontal support, the face of which is visible through the upper window 11 which may be opened to set and wind the clock as desired. The drive for the selector disc includes rearwardly extending shaft 62 which is adapted to rotate a bevelled gear 63 cooperating with a bevelled gear 64 to rotate a vertical shaft 65, the lower end of which is provided with a worm gear 66 adapted to cooperate with a gear 67 for rotation of a shaft 68 with which the selector disc 60 is adapted to rotate. Reference may be had to Figs. 5 and 6 for details of the mounting of the shaft 68 which is journalled through a housing 69; the selector disc being secured in conjunction with a bushing 70 mounted for rotation with the shaft 68 by the provision of a transversely extending pin 71. The disc 60 is secured in a recess in the bushing 70 by a disc 73 secured to the bushing 70 by the expediency of the threaded engagement with the shaft 68 by an operating knob 72 as illustrated.

Referring more particularly to the detailed views including Figs. 8 to 12 inclusive of the selector disc, it will be seen that the disc includes a face 75 provided with a plurality of radial apertures 76 and a rearwardly extending peripheral flange 77 including apertures 78 corresponding with the radial apertures 76. Secured to the inner face of the flange 77 adjacent the apertures 78, there is provided a plurality of resilient aperture closure members 79.

Mounted within the radial apertures 76 there is provided a slidable outer detent 80 formed in accordance with the structure illustrated in detail in Fig. 9. The detent includes a body 81 including side flanges 82 adapted to bear against the inner face of the selector disc and extending rearwardly to provide an ear 83 adapted to receive therethrough a contacting member 84. The body 81 extends through the aperture 76 and is provided on the opposite side of the selector disc with a semi-resilient plate 85 provided with extruded portions 86 adapted to be received within depressions in the front face of the disc 75, whereby the detent will be retained in its adjusted position.

The assembly is completed by the provision of an operating handle 87 extending forwardly from the plate 75 and visible through the lower window 11 which may be opened to permit operation thereof. It will readily be seen that upon movement of the detent 80 outwardly to its full extent, the contacting member 84 will engage the corresponding closure 79, forcing it against the flange 77 and closing the aperture 78 therein. It will be seen that the detent 80 is adapted by action of the plate 85 to be held in its adjusted position for closing the aperture 78, or in its adjusted retracted position; these positions being respectively shown in Figs. 12 and 11.

Similarly mounted within the radial apertures 76 a lower detent 90 is provided of construction similar to that of the detent 80 with the exception of the fact that the contacting member 84 is not used, and the ear 83 is formed of a non-conducting material as indicated at 91. Associated with the plate 75 and extending rearwardly therefrom midway between the extremities of the apertures 76, stop pins 92 are provided adapted to limit the inner movement of the outer detent and the outward movement of the inner detent. It will be readily seen that upon outward positioning of the inner detent 90 that the projecting ear 91 thereof is adapted to contact with an electrical switch as will be hereinafter described.

For controlling the electrical circuit to energize the motor 48 in response to settings of the detents 80 and 90 of the continuously rotating selector disc 60, reference may be had to the diagrammatic illustration of the electrical circuit of Fig. 20 in which there is illustrated an external source of electrical energy corresponding with the conductors 13 and plug 12. One side of the circuit delivers directly to the motor 48 while the opposite side delivers through a conductor 96 and is controlled first by a pair of contacting fingers 97, which, when contacted deliver energy through a conductor 98 and resilient finger 99 to a movable contacting member 100 pivoted as at 101 to a portion of the base 69 through which the energy is delivered to a pivotally mounted retainer 102, which may upon proper contact deliver energy to a spring finger 103 and thence through conductor 104 to motor 48 thus completing the circuit.

Referring more particularly to Fig. 14, it will be seen that the contact of the member 97 is controlled by a non-conducting projection 105 carried upon the inner end of a pivoted arm 106, the opposite end of which is provided with a downwardly extending non-conducting finger 107 together with a weight 108 which tends to hold the arm 106 in a counter-clockwise revolved position with respect to its pivotal point, whereby the finger 105 forces upwardly the lower member 97, whereby it contacts with the upper member and the circuit is completed thus far. The finger 107 is adapted to remain stationary while the flange 77 of the revolving selector disc 60 moves thereunder. It will be readily seen that when the selector disc has moved to register one of the apertures 78 with the finger 107, that if the detent 80 has been moved inwardly thus releasing the closure 79, that the finger 107 will be received through the aperture thereunder, and will thus permit the counter clockwise rotation of the arm 106 above referred to, whereby the contacting members 97 will be united to complete the electrical circuit therethrough, this position of the finger 107 having been illustrated in Fig. 11 of the drawings. It will be readily seen however, that if the detent 80 has been moved outwardly whereby the closure 79 closes the aperture 78, the finger 107 will not be received through the aperture, and no substantial movement of the arm will take place, this position being illustrated in Fig. 12 of the accompanying drawings.

It may thus readily be seen that the energization of the motor 48 in so far as the members 97 are concerned will be normally prevented during such time as the finger 107 is not received through one of the openings 78. Thus, it may be seen that a selected moving of the detents 80 outwardly will prevent a completion of the circuit by retaining the members 97 separated during any desired portion of the rotation of the selector disc 60, but that the circuit may be completed in so far as these contacts are concerned by positioning any desired one or group of detents 80 inwardly as indicated in Figure 11.

For controlling the electrical circuit in response to the setting of the inner detent 90, there is provided, as illustrated in Figure 13, a pivoted retainer member 102 mounted upon the base 69 and electrically associated therewith, one end of which is provided with a non-conducting extremity 111 adapted to contact with and be moved by the non-conducting projection 91 of the inner detent 90 when the detent is in its outward position, as indicated in Figures 12 and 13. The opposite end of the retainer 102 is formed at right angles and includes at its extremity a catch portion 110 adapted to receive thereunder the spring finger 103. The normal position of the finger 103 is that of being engaged under the catch 110 and thus completing the electrical circuit which passes through the retainer 102, member 103 and through the conductor 104, which it will be understood is mounted upon the base 69 but insulated therefrom. Thus, it may readily be seen that with the inner detents in their inner position, and the circuit having been completed as indicated by the dotted lines in Figure 13, the energization of the motor will not be interfered with, but that upon outward positioning of one of the detents 90 the detent will upon reaching the arm 102 strike the extension 111, rock the arm in clockwise direction, and thus disengage the tongue 103 therefrom, whereby the circuit will be broken therethrough.

It will be readily understood that the arm 102 is maintained normally in the dotted line position of Fig. 13 through the action of a simple leaf spring 112. After the above referred to releasing action, under the influence of the contact of the detent 90 has taken place, it will be understood that the circuit may again be completed by an operation of the knob 14 extending through the side of the cabinet. The knob is associated with a shaft 114 shown in Figure 13, the inner end of which is provided with a non-conducting contact member 115, the knob being normally held in retracted position through the influence of the spring 116.

After the tongue 103 has been released, inward movement of the rod 114 causes the tongue 103 to be pushed inwardly, effecting a camming operation of the arm 102, whereby it is forced outwardly against the tension of the spring 112, and may then move inwardly under the influence of the spring 112 to secure the tongue 103 in electrical conducting relation therewith, which relation is the normal position of the mechanism during the operation thereof.

From the foregoing it will be readily seen that considering only the two above-referred to circuit controlling members, that should the selector disc 60 be rotated from the position shown in Fig. 11, in which the circuit is completed, the finger 107 will be caused to move upwardly due to the sloping rear edge of the apertures 78 of the selector disc and the slope of the closure member 79. Thus the circuit will be broken, and will continue broken through the contacts 97 until the next open aperture 78 is reached, at which point it will again be closed, and the motor will be caused to rotate.

Due to the difficulties involved in providing delicate accuracies in the mechanism whereby only one revolution of the gear 44 will be effected at the closure of the contacts 97, there has been provided supplementary means insuring only a single rotation of the gear 44 in response to energization of the motor by virtue of the passage of the finger 107 through one of the apertures 78. This means includes the pivoted member or arm 100 (Fig. 14), the vertical portion of which terminates in a catch end 120, which is adapted to receive and make electrical contact with the spring tongue 99. The opposite end of the arm 100 terminates in a horizontal extension 121; the arm 100 being normally urged toward the tongue 99 by the provision of a suitable spring 122 (Fig. 17).

Mounted upon the gear 44 there is provided an extending portion 123, which is adapted to strike the end 121 of the arm 100 and rotate it about its pivotal point 101, whereby the hooked end 120 leaves the tongue 99, breaking the circuit therethrough. Thus it will be seen that after one completed revolution of the gear 44, the projection 123 is brought into contact with the end 121 of the arm 100, moving it outwardly and disengaging it from the tongue 99, whereby the circuit is broken. In the operation of the device, it will be seen that upon movement of the arm 100 to release the tongue 99, the tongue will move upwardly so that should the hook 120 fall back into the normal position, it will not contact with the tongue 99, thus maintaining the electrical circuit broken through the tongue 99 until the disc has rotated to eject the finger 107 from the aperture 78 and thus move the tongue 99 downwardly to reengage with the hook end 120.

For preventing the stopping of the motor in such a position as to maintain the arm 100 in contact with the projection 123, a supplementary circuit including the conductor 96a, is provided, which maintains the gear 44 and its projection 123 at the potential of the incoming circuit 96. It will be seen that during the contact of the projection 123 with the arm 100, the circuit is completed through the pivot point 101 and the base 69, regardless of the respective positions of the tongues 97 and 99. Thus it may be seen that additional energization of the motor is accomplished to rotate the gear 44 to such a point that the contact 123 breaks from the arm 121 despite the fact that the electrical connection is severed by virtue of the spring 122 acting upon the arm 100 to return it to normal position but out of engagement with the tongue 99, as hereinbefore described.

It will readily be seen that as the selector disc moves to eject the finger 107 from the aperture 78 therein, the pin 124 is moved downwardly to place the tongue 99 into engagement with the hooked end 120. As the pin 124 goes back to close the circuit the tongues 97 separate. When the selector disc has moved to again admit the finger 107 through an aperture 78 therein, as before noted the arm 106 moves to close the contacts 97. The arm 121 is maintained in engaged position with the tongue 99 while the motor continues to operate through supplemental energization by the conductor 96a. Energization of the motor by the conductor 96a continues until the gear 44 has made one complete revolution, at which time the projection 123 of the gear strikes the end 121 of the arm 100, thus rocking it about its pivot 101 and releasing the tongue 99 whereby the circuit is broken.

In considering the electrical circuit above referred to, it will be noted that the support 69 is insulated by the provision of insulating material 125 between it and the base of the machine, and that the terminal point of the tongue 103 is similarly insulated from the base 69. It will also be noted that the inwardly projecting ears 91 of the detents 90 are formed of non-conducting material, and that the fingers 105 and 124 are also formed of insulating material whereby the possibility of inadvertent energization of the motor, or short circuits, or leaking of current throughout the apparatus, is prevented.

From the foregoing it may readily be seen that in the operation of the device, the successive immersion of material contained within the cage is readily accomplished; the length of duration of submersion in any one receptacle being in accordance with the selection of the position of the detents 80, and that at any desired predetermined time, the complete circuit may be broken and further operation stopped by the selective setting of the lower detents 90.

It will be understood that the gearing between the clock and the selector discs, determines the time interval between any of the various detents, and it will be understood that this gearing may be arranged to provide any desired time factor therebetween, so that the immersion of material may be readily controlled. It may further be understood that the invention is not limited to the use of the number of receptacles as illustrated, but that by the provision of a varying characteristic of the Geneva movement, any corresponding number of receptacles may be provisioned in association with the machine and that similar Geneva movements may be utilized in varying ways to provide dissimilar but co-ordinated movements of a cage or a plurality of cages in combination with vertical movement.

As formerly pointed out, it is to be understood that the invention may be used in a considerable number of various processes, and that the invention is not limited to the specific mechanical features involved or disclosed herein, and that numerous changes and modifications may be resorted to, and the full use of equivalents made without departing from the spirit or scope of the present invention as outlined in the appended claims.

I claim:

1. In a device of the character set forth, a plurality of stationary receptacles, a movable receptacle, a rotatable and vertically movable shaft to which said movable receptacle is attached for movement thereby, a motor for vertically moving said shaft, and means operated by said motor for rotating said shaft, said means being operable only when said shaft is in raised position.

2. In a device of the character set forth, a plurality of stationary receptacles, a movable receptacle, a rotatable and vertically movable shaft to which said movable receptacle is attached for movement thereby, a motor for vertically moving said shaft, and means operated by said motor for rotating said shaft, said means being operable only when said shaft is in raised position, and including a Geneva gear through which said shaft is slidably mounted.

3. In a device of the character set forth, a plurality of stationary receptacles, a movable receptacle, a rotatable and vertically movable shaft to which said movable receptacle is attached for movement thereby, a motor for vertically moving said shaft, means operated by said motor for rotating said shaft, said means being operable only when said shaft is in raised position and including a Geneva gear through which said shaft is slidably mounted, and a vertical groove within said shaft, said gear including a screw carried thereby receivable within said groove whereby rotation of said gear will impart rotation to said shaft and whereby said shaft is vertically movable with respect to said gear.

4. In a device of the character set forth, a plurality of stationary receptacles, a movable receptacle, a rotatable and vertically movable shaft to which said movable receptacle is attached for movement thereby, a motor for vertically moving said shaft, means operated by said motor for rotating said shaft, said means being operable only when said shaft is in raised position and including a Geneva gear through which said shaft is slidably mounted, a vertical groove within said shaft, said gear including a screw carried thereby and receivable within said groove whereby rotation of said gear will impart rotation to said shaft and whereby said shaft is vertically movable with respect to said gear, and a co-operating gear operable by said motor to move said Geneva gear after said shaft has been moved vertically upward.

5. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft.

6. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank.

7. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position.

8. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position, said shaft including a lower extremity connected for rotation with respect to the main portion of said shaft.

9. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position, said shaft including a lower extremity connected for rotation with respect to the main portion of said shaft, said lower extremity being associated with said crank whereby said shaft is free to rotate with respect to said crank and the lower extremity.

10. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position, said shaft including a lower extremity connected for rotation with respect to the main portion of said shaft, said lower extremity being associated with said crank whereby said shaft is free to rotate with respect to said crank and the lower extremity, said shaft further including a detachable upper extremity.

11. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, and means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position, said shaft including a lower extremity connected for rotation with respect to the main portion of said shaft, said lower extremity being associated with said crank whereby said shaft is free to rotate with respect to said crank and the lower extremity, said shaft further including a detachable upper extremity, said upper extremity including an aperture therethrough and a receptacle-supporting arm extending through said aperture.

12. In a device of the character described, a plurality of fixed receptacles and a movable receptacle, a vertically movable rotatable shaft for supporting said fixed receptacles, a motor for operating said shaft, a crank operable by said motor associated with the lower end of said shaft, whereby rotation of said motor will vertically reciprocate said shaft, means intermediate the extremities of said shaft for imparting rotary motion to said shaft, said means including a Geneva gear operable by said motor in timed sequence with the operation of said crank, said sequence being such that said shaft will be rotated by said motor only when said shaft is in raised position, said shaft including a lower extremity connected for rotation with respect to the main portion of said shaft, said lower extremity being associated with said crank whereby said shaft is free to rotate with respect to said crank and the lower extremity, said shaft further including a detachable upper extremity, said upper extremity including an aperture therethrough and a receptacle-supporting arm extending through said aperture, and a screw carried by said last-mentioned extremity for adjustably securing said arm to said shaft.

LOUIS GROSS.